United States Patent [19]
Weiner

[11] Patent Number: 5,636,357
[45] Date of Patent: Jun. 3, 1997

[54] MEMORY CARD AND METHOD FOR OPERATION IN A PLURALITY OF SYSTEMS HAVING INCOMPATIBLE OBJECT CODE FORMAT REQUIREMENTS

[75] Inventor: Frank Weiner, Rochester, N.Y.

[73] Assignee: Eurotronics Company, Fairport, N.Y.

[21] Appl. No.: 361,056

[22] Filed: Dec. 21, 1994

[51] Int. Cl.$^6$ .................................................. G06F 12/00
[52] U.S. Cl. ........................................... 395/442; 395/833
[58] Field of Search ................................... 395/600, 282, 395/283, 284, 833, 442, 650

[56] References Cited

U.S. PATENT DOCUMENTS

| | | | |
|---|---|---|---|
| 5,319,751 | 6/1994 | Garney | 395/650 |
| 5,410,717 | 4/1995 | Floro | 395/800 |
| 5,485,590 | 1/1996 | Hyatt et al. | 395/442 |
| 5,537,597 | 7/1996 | Sandage | 395/700 |

OTHER PUBLICATIONS

Morgenstern, FormatterFive reads PCMCIA, MacWeek, v8, n21, p. 6(1) May 23, 1994.

Rist, Power and potential, PC Magazine, v12, n22, p. 263(10) Dec. 21, 1993.

Krause, Disk drive, flash makers seek multi-platform use, Electronic News, v39, n1970, p. 1(2) Jul. 5, 1993.

Moeller, SunDisk rolls out new mini flash card, PC Week, v11, n43, p. 57(2) Oct. 31, 1994.

Lee, IBM improves PCMCIA communications, InfoWorld, v16, n49, p. 40(1) Dec. 5, 1994.

*Primary Examiner*—Matthew M. Kim
*Attorney, Agent, or Firm*—Howard S. Robbins

[57] ABSTRACT

Application software and data files (21–25, 31–34) for operating systems and processors having incompatible object code format requirements may be placed on the same memory card (10). Memory card (10) may be used by any system (16, 18) receiving the physical format of memory card (10) and whose operating system can read the logical format of memory card (10). At least one card configuration file (40) having a preselected name unique to each operating system having different object code format requirements is stored on memory card (10). Card configuration file (40) includes the names and location information for only application software and data files (21–25, 31–34) accessible and executable by that operating system. Consequently, each operating system recognizes only that application software and data files having compatible object code format requirements.

13 Claims, 3 Drawing Sheets

5,636,357

MEMORY CARD AND METHOD FOR OPERATION IN A PLURALITY OF SYSTEMS HAVING INCOMPATIBLE OBJECT CODE FORMAT REQUIREMENTS

TECHNICAL FIELD

The present invention relates generally to devices which allow processor based systems, and especially portable processor based systems, to access additional application software or data. More particularly, the present invention relates to portable media for processor based systems such as memory cards. Still more specifically, the present invention pertains to a method by which application software and data for systems having incompatible object code formats may be stored on and operated from the same memory card or other portable media.

BACKGROUND ART

The advent of small, processor based systems has given rise to portable devices capable of performing a seemingly limitless variety of applications. The personal computer has become ubiquitous, and is now commonly available in portable form factors from laptop to notebook to the handheld palmtop. In addition, the use of systems where size and power consumption is minimized and tailored to the application, is becoming more widespread.

Users and manufacturers alike have appreciated that the utility of processor based systems, and especially such handheld systems, can be increased greatly where applications and data may be selectively added and removed by the user. This desire for greater versatility in small form factor packages has been recently accommodated by removable, business-card sized memory cards having non-volatile memory in which may be stored additional application software of interest to the user and data or other information for use with the additional or other applications native to the handheld system.

Some systems allow the user to search and retrieve the information stored on a removable memory card having an overall proprietary organization. A growing number of manufacturers now include in both handheld and larger systems connectors to receive user installable memory cards conforming to the standards promulgated by the Personal Computer Memory Card International Association (PCMCIA) of Sunnyvale, Calif.

Unfortunately, the object code type in many handheld systems is proprietary to the manufacturer. The result is that even though a memory card may be physically insertable into the connector provided on a given system, only the system for which it was specifically created is able to execute any application program and access any data stored thereon. This forces users to acquire separate memory cards with the same application and/or data for each system with which they desire to use the application or data.

A better understanding of the deficiencies of such existing memory devices may be achieved with a brief review of certain principals of digital memory storage. The way in which information is stored and accessed on digital memory media is a function of physical characteristics of the media and the hardware that reads from and writes to the media (collectively called the physical format), and various logical characteristics of the media set by the hardware according to immutable elements of the hardware and instructions from the operating system (collectively called the logical format). The logical format of a memory system defines the file structure—the form and location of the files which contain application software and data. Of course, the format with which the application software and data is recorded (collectively called the object code) is a function of the type of processor employed by the system. Thus, whether the contents of a file is useable in a given system (i.e., whether the application software can execute and data can be understood) further depends on the compatibility of a file's object code format with the processor type used by the handheld system.

The PCMCIA standard provides a common physical format for memory cards. The logical format most widely used with personal computers and many handheld systems is that specified by the Disk Operating System from Microsoft Corporation of Redmond, Wash. (MS-DOS) executing on systems having a processor compatible with the x86 family of microprocessors from Intel Corporation of Santa Clara Calif. The MS-DOS logical format separates the media into several areas including a directory, a file allocation table (FAT) and a data area. As is very well known, the directory includes the names of all files on the media, where they start and their length; the FAT includes the location on the media of all parts of each file; and the data area includes the actual application program and data files.

Heretofore applications and data stored in removable memory could only be shared between devices if the physical, logical and object code formats were identical. But systems having the PCMCIA physical format and MS-DOS logical format still may and often do employ their own object code format. Even where the physical format and logical format of media is the same for two separate systems, attempted reading or execution of files whose object code is compatible with operating systems different from the one used with the system attempting access (the "foreign" system) could lockup the accessing system or at least result in unintelligible displays and/or actions confusing to users.

I have appreciated that what is necessary to overcome these shortcomings is a memory card that can store application software and data for a variety of object code formats in such a manner that application software and data for one system does not interfere with application software and data for another incompatible system. Moreover, specific application software and data should be accessible only when fully compatible with the processor used with the system attempting access, providing added security and ease of use. I have invented a memory card and method for placing application software and data in files for systems using incompatible object code types on a single memory card, and allowing any system employing the same physical and logical format to access just the files having the object code type utilized by that system.

SUMMARY OF THE INVENTION

It is, therefore, an object of the present invention to provide digital file storage media such as a memory card with application software and/or data for systems having incompatible object code formats.

It is another object of the present invention to provide digital file storage media such as a memory card, as set forth above, in which each system receiving the memory card recognizes as being present only application software and/or data in files stored on the memory card whose object code format is compatible with the object code format requirements of the accessing system.

It is still another object of the present invention to provide digital file storage media such as a memory card, as set forth above, in which each system receiving the memory card will execute the application software and access the data in files stored on the memory card which have compatible object code formats.

It is yet another object of the present invention to provide digital file storage media such as a memory card, as set forth above, in which no user action will be required for each system receiving the memory card to recognize and utilize the application software and/or data in files stored on the memory card which have compatible object code formats.

It is a further object of the present invention to provide digital file storage media such as a memory card, as set forth above, in which each system receiving the memory card will only present to the user the application software and data in files which have compatible object code format, thereby precluding user confusion about which application software and data may be accessed on that system.

It is still a further object of the present invention to provide digital file storage media such as a memory card, as set forth above, with any physical format and logical format desired, that will be shareable by all systems accepting memory with that physical format and logical format irrespective of the object code format requirements of the processor in use.

It is yet a further object of the present invention to provide digital file storage media such as a memory card, as set forth above, in which applications executing in one system can recognize common data files, thereby allowing data files to be shared across system boundaries and reducing total memory size requirements while maintaining full functionality.

These and other objects and advantages of the present invention over existing prior art forms will become more apparent and fully understood from the following description in conjunction with the accompanying drawings.

In general, a memory card for operating both in a first system having a first object code format and in a second system having a second object code format different than that of said first object code format, the memory card including at least one of an executable application file and a data file, includes a card configuration file stored on the memory card specifying the name and location information on the memory card of only each said executable application file having the second object code format and each data file readable under the second object code format. A method for operating a memory card both in a first system having a first object code format and in a second system having a second object code format different than that of said first object code format, the memory card including at least one of an executable application file and a data file, includes the steps of storing a card configuration file specifying the name and location information on the memory card of only each executable application file and each data file having the second object code format, reading the card configuration file, displaying the name of each application having the second object code format, selecting an application having the second object code format, and, executing the selected application.

PREFERRED EMBODIMENT FOR CARRYING OUT THE INVENTION

Figure 1:
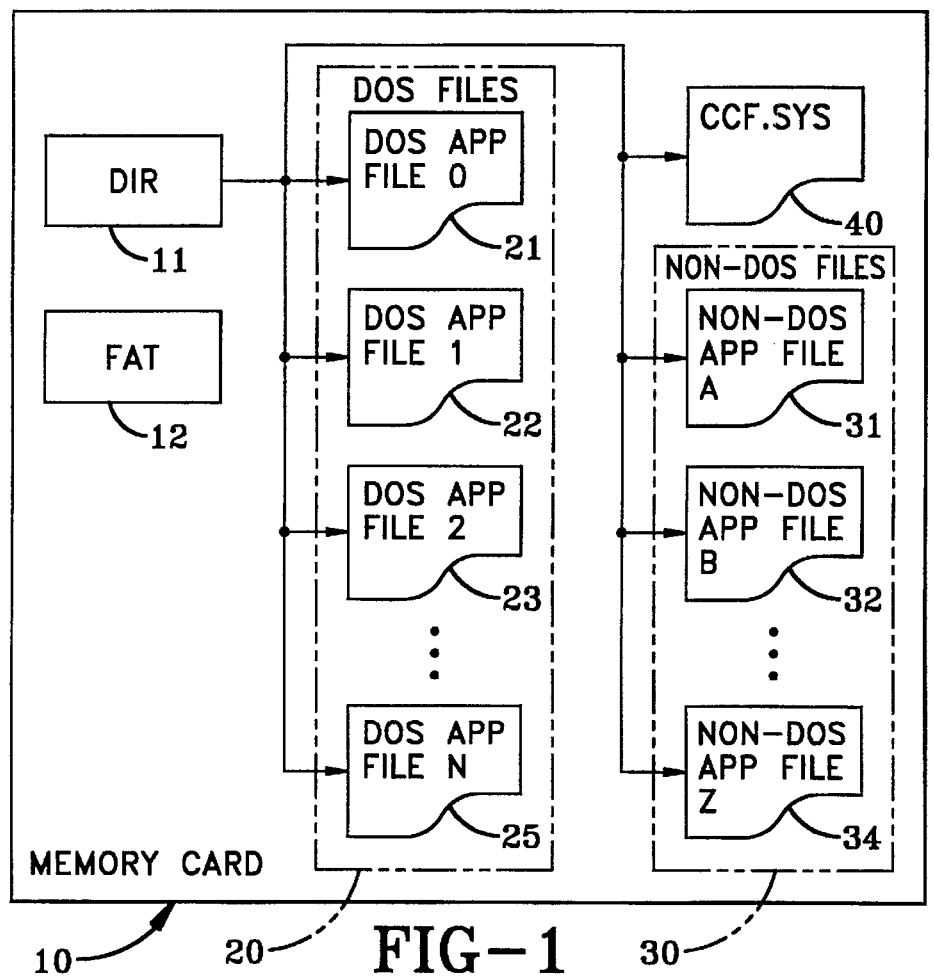
FIG. 1 depicts a block diagram of a memory card having a physical format specified by PCMCIA and the logical format of Microsoft-DOS (MS-DOS) organized media. The memory card includes a plurality of files (Files 0 through n) readable and executable under MS-DOS in a system having an x86 Intel Corporation compatible processor, a plurality of files (Files A through Z) readable and executable under a proprietary operating system (not MS-DOS compatible) in a system having a processor other than an x86 Intel Corporation compatible processor, and a Card Configuration File (CCF.SYS) in accordance with the present invention.

FIG. 1 presents a block diagram of an exemplary memory card, indicated generally by the numeral 10, in accordance with the concept of the present invention. Memory card 10 preferably has the physical format of PCMCIA organized media and the logical format of Microsoft DOS (MS-DOS) organized media, and therefor includes a directory 11, at least one file allocation table (FAT) 12, and a plurality of files 20 readable and, where in executable form, executable under MS-DOS in a system having an x86 Intel Corporation compatible processor. Memory card 10 further includes a plurality of files 30 readable but not, when in executable form, executable under MS-DOS in a system having an x86 Intel Corporation compatible processor, and a Card Configuration File 40 (CCF.SYS 40).

As is customary under the MS-DOS logical format, directory 11 includes the name, length, attributes and starting location of every file stored on memory card 10. Also, one MS-DOS logical format attribute allows each file to be hidden from most MS-DOS commands. For example, a file with the Hidden attribute bit set will not be displayed when a list directory command DIR is entered by the user to list the contents of the directory.

Figure 2:
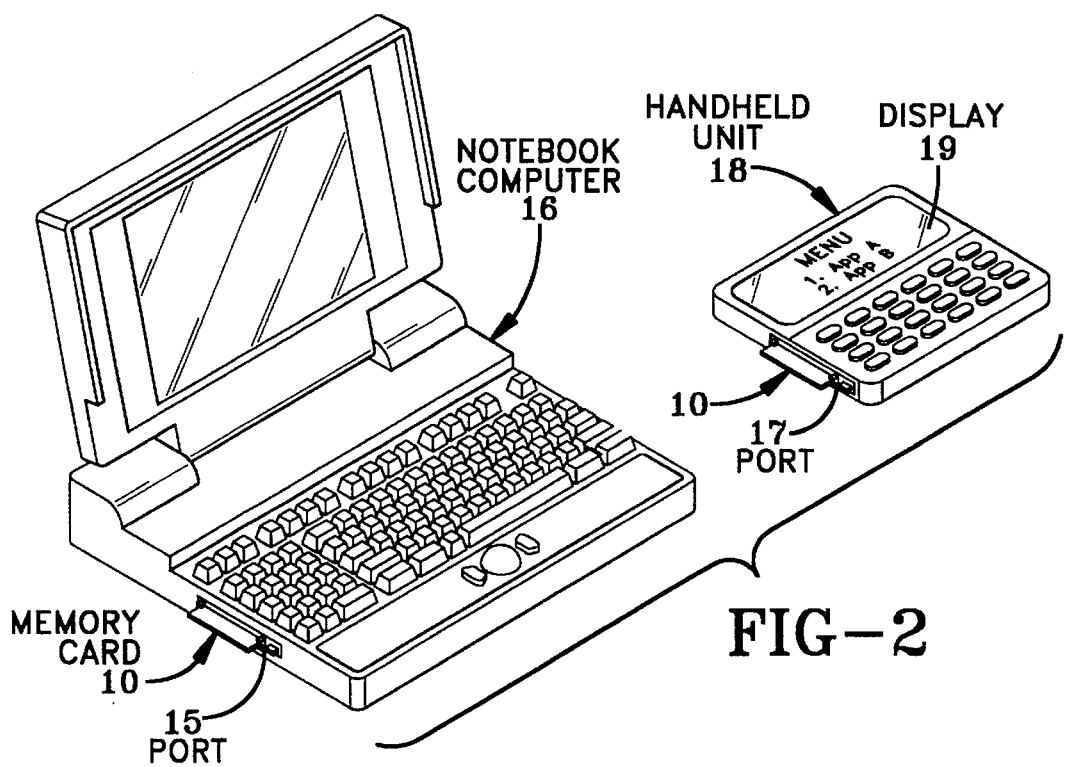
FIG. 2 presents a perspective view of two exemplary devices, a conventional notebook computer operating under MS-DOS in a system having an x86 Intel Corporation compatible processor, and a handheld unit operating under a proprietary operating system in a system having a processor other that an x86 Intel Corporation compatible processor, which both receive the memory card shown in FIG. 1, and read and run executable files stored therein compliant with their respective operating systems and processor types.

Memory card 10 may be a conventional memory card conforming to the standards of the Personal Computer Memory Card International Association (PCMCIA) of Sunnyvale, Calif., insertable into any PCMCIA compatible port 15, as illustrated in FIG. 2 in the notebook computer 16 employing the MS-DOS operating system, and port 17, as illustrated in the handheld unit 18 employing a proprietary, closed operating system capable of accessing memory organized in accordance with the MS-DOS logical format. Thus, in the present example, both the MS-DOS computer 16 and the non-DOS handheld unit 18 may receive memory card 10 and access files stored thereon. Handheld units, and particularly those that operate other than with the MS-DOS operating system like handheld unit 18, commonly include a menu manager and display 19 to simplify and facilitate user interaction by listing the available applications and, upon user selection, begin execution of the appropriate application software.

The Card Configuration File (CCF.SYS) 40 is a conventional MS-DOS file that stores the file name and associated application name for each file not intended for use with MS-DOS. The proprietary operating system must include software allowing it to locate and read card configuration file 40, and access directory 11 and FAT 12 for the additional information required to access the selected files as provided under the MS-DOS logical format. It will be understood that any name may be preselected for card configuration file 40, so long as that name is known to the proprietary operating system onboard the non-DOS accessing system, handheld unit 18 in the present example.

Operation of an application stored on memory card 10, or access of data stored on memory card 10 will of course depend on whether or not the system making use of memory card 10 employs an MS-DOS or some other operating system. In a system employing the MS-DOS operating system such as notebook computer 16, the card configuration file 40 and the files not intended for use with that operating system are hidden from the MS-DOS user and MS-DOS applications using the hidden file attribute. In this manner memory card 10 appears to the user as a conventional MS-DOS memory device, and can be used in the conventional manner.

Figure 3:
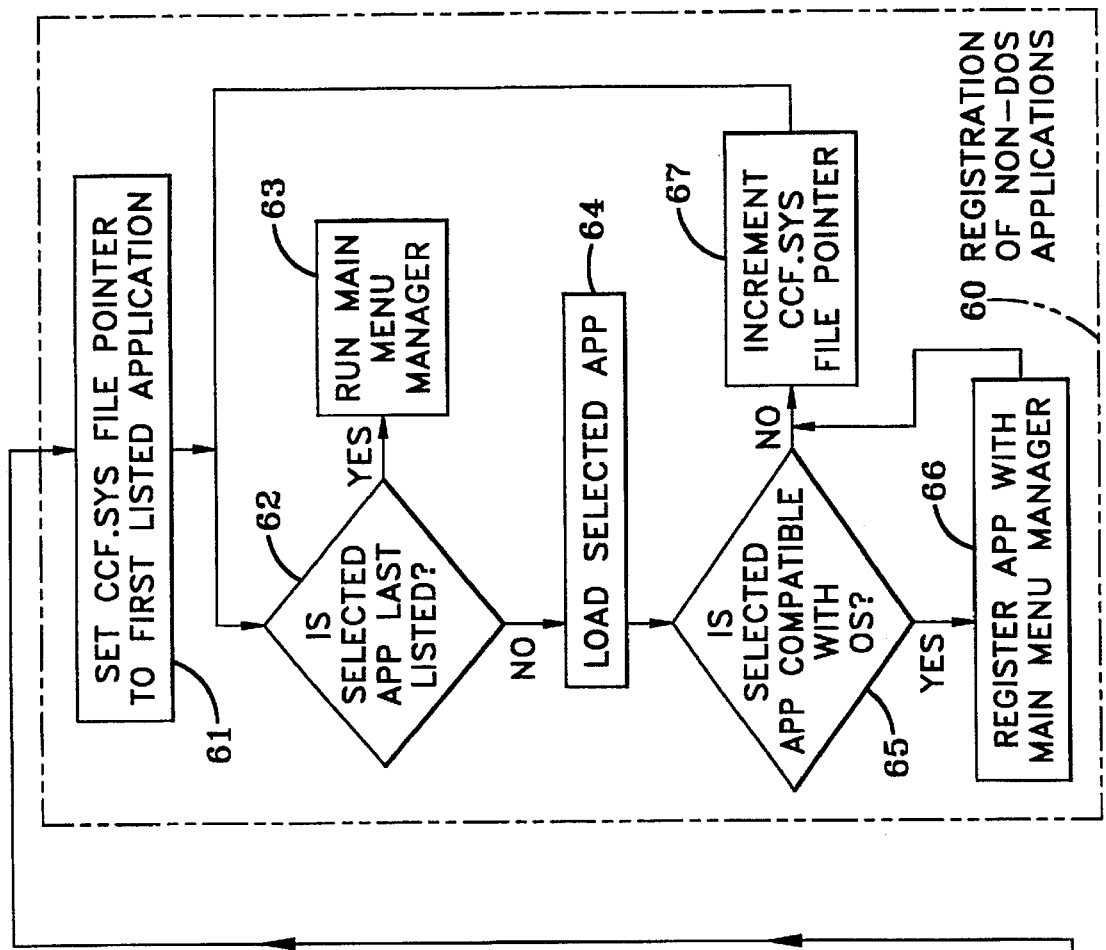
FIG. 3 presents a flow chart of an exemplary method in accordance with the present invention by which the plurality of Files A through Z readable but not executable under the native operating system (MS-DOS) may be identified and executed from the same memory card under their respective operating system.
Figure 3:
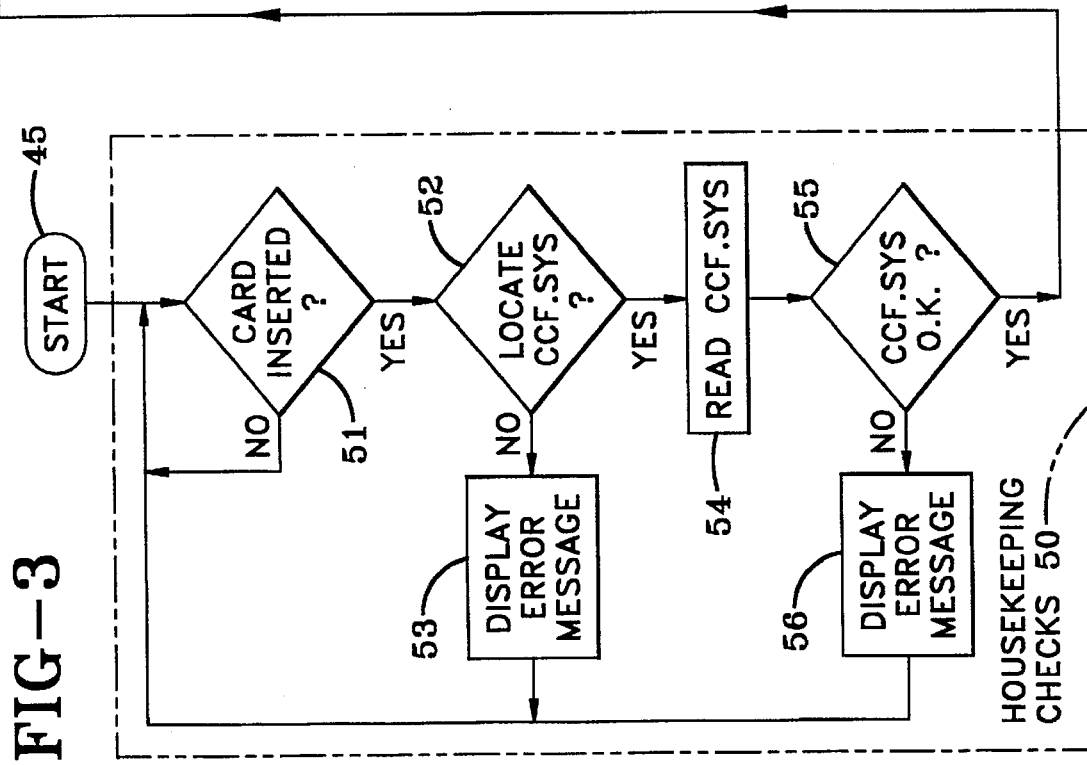
Figure 4:
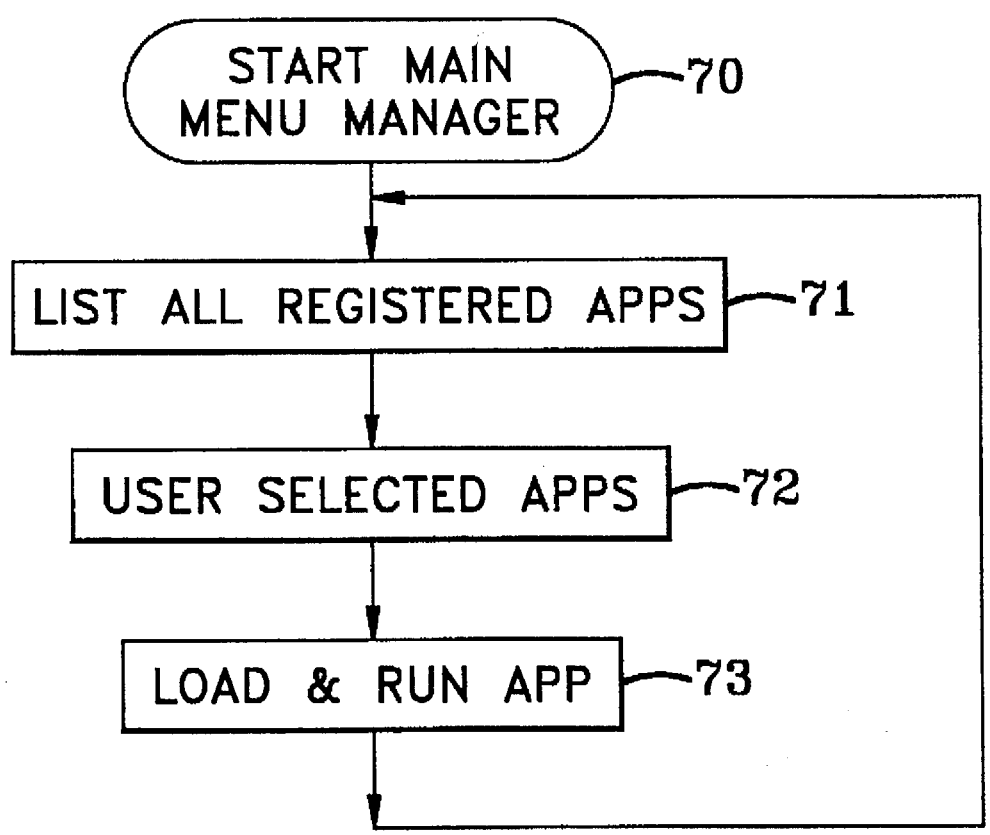
FIG. 4 presents a flow chart of an exemplary method in accordance with the present invention by which the applications of Files A through Z readable but not executable under the native operating system (MS-DOS) may be identified to and selected by a user for execution.

In a system employing an operating system other than MS-DOS, operation of an application stored on memory card 10 may be best appreciated from the top-level flowchart depicted in FIG. 3. Beginning with the start block 45, this exemplary operation can be seen to involve broadly two steps: housekeeping checks (in block 50) and, in block 60, registration of each non-MS-DOS application present on memory card 10 with a utility such as a main menu manager for identification to and selection by the user.

The housekeeping checks begin with a test in block 51 whether a memory card 10 is inserted into PCMCIA port 15 or 17, and, if not, the test is repeated until a memory card 10 is found. Once a memory card 10 is found, the directory of memory card 10 is scanned in step 52 to locate the card configuration file 40 having the preselected filename, CCF.SYS in the present example. If the card configuration file 40 is not found, an appropriate error message may be displayed to the user as noted in block 53, and testing for the presence of a suitable memory card 10 resumed. If the card configuration file 40 is found, it is read (block 54) and checked for form and content (block 55). If CCF.SYS is unreadable, damaged in form or empty, once again an appropriate error message may be display to the user (block 56) and testing for a suitable memory card 10 resumed.

Once a CCF.SYS file in proper form has been located, an operating system pointer may be set to the first application software listed in the CCF.SYS file (block 61). This application software is tested (block 62) to determine if it is the last listed application software. If so, main menu manager 19 may be run as explained further hereinafter (block 63). If the application software to which the pointer is newly directed is not the last listed application software, the non-DOS operating system of handheld unit 18 loads that application software (block 64) and tests it to ascertain whether it is compatible with that operating system (block 65). If so, its presence and name is registered with the main menu manager (block 66), and the CCF.SYS file pointer is incremented (block 67) and the file to which the file pointer is now directed tested to determine if it is the last application software (block 62). If that application software is not compatible with that operating system, the CCF.SYS file pointer is directly incremented (block 67).

It will be understood that since data files are all in MS-DOS logical format, any application software knowing its name may access such a file using the conventional MS-DOS directory and FAT architecture. Thus, both the selected general operating system (here MS-DOS) and the proprietary, (non-MS-DOS) operating system may share selected files in a manner completely transparent to the user and the application software.

The skilled artisan should now appreciate several salient aspects of the present invention. For example, memory card 10 may have any physical format and logical format consistent with that used by media in the systems with which memory card 10 is to operate. The choice for the example hereinabove is based upon the widespread use of both the PCMCIA form factor and the MS-DOS logical format.

It will also be understood that the present invention allows files having any number of different object code formats to coexist on the same media. In that instance a separate card configuration file with a unique name may be selected for the files associated with each different operating system.

Another significant aspect of the present invention is that systems having different processor dictated object code formats may share the same data files by insuring that the application software can read data files having the file structure of interest. Thus, applications such as Microsoft Word that utilize the same internal file organization whether operating under MS-DOS or Apple Macintosh System 7 will be able to directly utilize the same word processing files.

Inasmuch as the present invention is subject to many variations, modifications and changes in detail, a number of which have been expressly stated herein, it is intended that all matter described throughout this entire specification or shown in the accompanying drawings be interpreted as illustrative and not in a limiting sense. It should thus be evident that a device constructed and method performed according to the concept of the present invention, and reasonably equivalent thereto, will accomplish the objects of the present invention and otherwise substantially improve the art of digital storage media such as memory card utilization in a plurality of systems having incompatible object code format requirements.

I claim:

1. A memory card for operating both in a first system having a first object code format and in a second system having a second object code format different than that of said first object code format, the memory card including at least one of an executable application file and a data file, the memory card comprising a card configuration file stored on the memory card specifying the name and location information on the memory card of only each said executable application file having said second object code format and each said data file readable under said second object code format.

2. A memory card, as set forth in claim 1, wherein the memory card has a physical format and a logical format common to both said first system and said second system.

3. A memory card, as set forth in claim 2, wherein said logical format includes a directory in which is stored a preselected name for said card configuration file, and the names of and location information regarding each said executable application file and each said data file stored on the memory card.

4. A memory card, as set forth in claim 3, wherein said directory includes a hidden file attribute associated with said card configuration file and each said executable application file and said data file, said attribute set to hide said card configuration file and each said executable application file having said second object code format and each said data file readable under said second object code format.

5. A memory card for operating in a plurality of systems including a first system having a first object code format and in a plurality of additional systems each having an object code format different than that of said first object code format, the memory card including at least one of an executable application file and a data file, the memory card comprising a card configuration file stored on the memory card specifying the name and location information on the memory card of only each said executable application file having an object code format different from that of said first object code format and each said data file readable under an object code format different from that of said first object code format.

6. A memory card, as set forth in claim 5, wherein the memory card has a physical format and a logical format common to said first system and all said additional systems.

7. A memory card, as set forth in claim 6, wherein the memory card includes a card configuration file for each said object code format different from that of said first object code format.

8. A memory card, as set forth in claim 7, wherein said logical format includes a directory in which is stored a preselected name for said card configuration file, and the names of and location information regarding each said executable application file and each said data file stored on the memory card.

9. A memory card, as set forth in claim 8, wherein said directory includes a hidden file attribute associated with said card configuration file and each said executable application file and said data file, said attribute set to hide said card configuration file and each said executable application file having an object code format different from said first object code format and each said data file readable under an object code format different from said first object code format.

10. A method for operating a memory card both in a first system having a first object code format and in a second system having a second object code format different than that of said first object code format, the memory card including at least one of an executable application file and a data file, the method comprising the steps of:

storing a card configuration file specifying the name and location information on the memory card of only each said executable application file and each said data file having said second object code format;

reading said card configuration file;

displaying the name of each application having said second object code format;

selecting an application having said second object code format; and, executing said selected application.

11. A method, as set forth in claim 10, further including testing for the presence and form of said card configuration file on the memory card.

12. A method, as set forth in claim 11, further including identifying each application present on the memory card having said second object code format and registering same with a user selection menu.

13. A method, as set forth in claim 12, wherein said step of storing includes setting an attribute for hiding said card configuration file and each said executable application file and said data file having said second object code format.

* * * * *